(12) United States Patent
Yang

(10) Patent No.: US 6,280,553 B1
(45) Date of Patent: Aug. 28, 2001

(54) METHOD FOR MAKING HOLOGRAM ORNAMENTAL STICKER

(76) Inventor: Daphne Yang, 5th Fl., No. 6, Lane 15, Sec. 6, Hsinyi Rd., Taipei (TW)

( * ) Notice: Subject to any disclaimer, the term of this patent is extended or adjusted under 35 U.S.C. 154(b) by 0 days.

(21) Appl. No.: 09/323,593

(22) Filed: Jun. 1, 1999

(51) Int. Cl.[7] .............................. B32B 31/12; B44C 1/10; B41M 3/00
(52) U.S. Cl. ...................... 156/235; 156/275.5; 156/277; 156/289; 427/147; 427/152
(58) Field of Search ..................................... 156/230, 233, 156/234, 235, 239, 240, 241, 275.5, 277, 289; 427/147, 152

(56) References Cited

U.S. PATENT DOCUMENTS

| | | | |
|---|---|---|---|
| 4,913,504 | * | 4/1990 | Gallagher . |
| 5,021,275 | * | 6/1991 | Kim . |
| 5,169,681 | * | 12/1992 | Kim . |
| 5,342,672 | * | 8/1994 | Killey . |
| 5,393,590 | * | 2/1995 | Caspari . |
| 5,520,958 | * | 5/1996 | Doesburg et al. . |

FOREIGN PATENT DOCUMENTS 0 505 689 * 9/1992 (EP) .

* cited by examiner

Primary Examiner—Curtis Mayes
(74) Attorney, Agent, or Firm—Kolisch, Hartwell, Dickinson, McCormack & Heuser

(57) ABSTRACT

A method for making ornamental hologram stickers that does not use cutters and is able to produce stickers with delicate figures thereon. The method includes coding a releasing agent onto a paper like base to form a releasing layer; adding adhesive resin to the releasing layer in a particular shape by screen printing to form an adhesive layer; adding a base plate layer with the same shape as the adhesive resin to the adhesive layer; adding the pattern to the base plate layer to form a hologram base layer via hot-stamping; adding the color to the hologram base layer to form a color printing layer; and adding a transparent foil on the color printing layer by screen printing to form a protective layer.

10 Claims, 3 Drawing Sheets

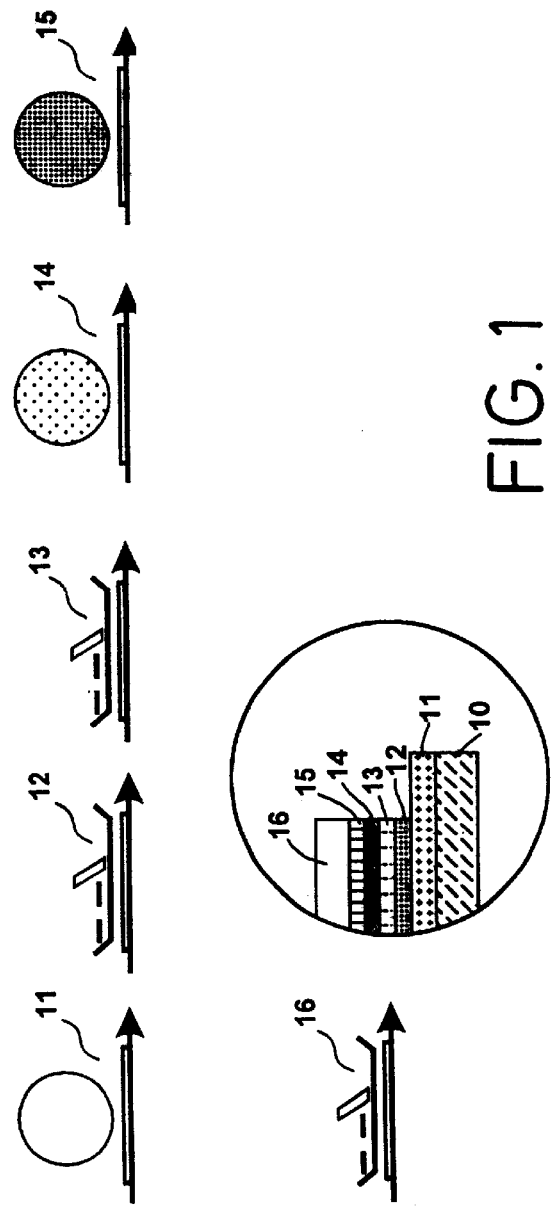
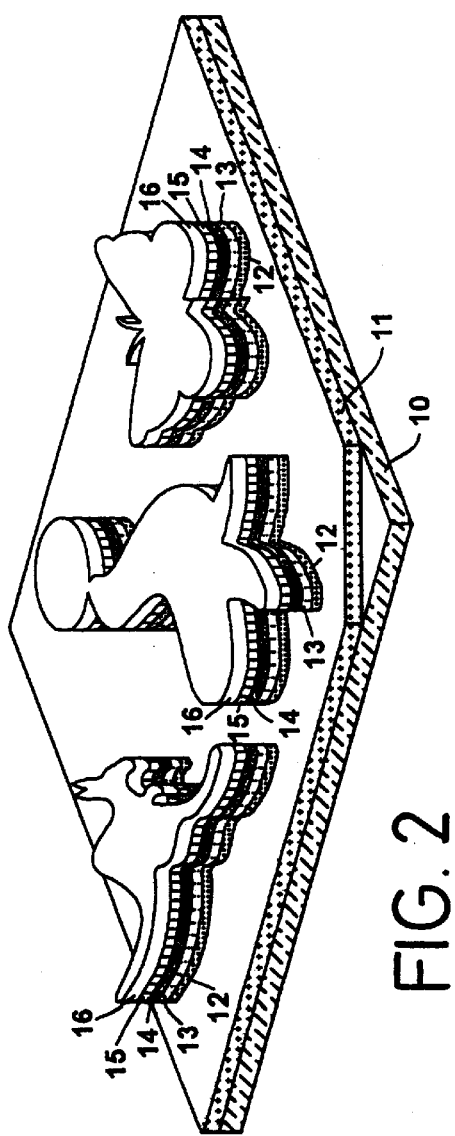

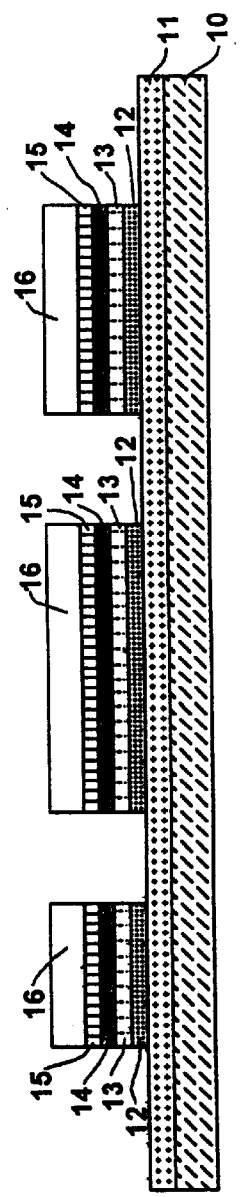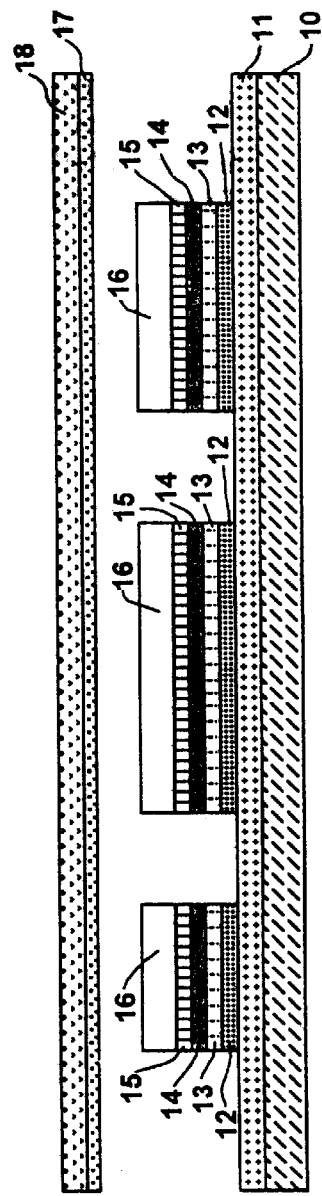

METHOD FOR MAKING HOLOGRAM ORNAMENTAL STICKER

FIELD OF THE INVENTION

The present invention relates to a method for making ornamental hologram stickers, and more particularly to a method which does not need a separate cutter to cut the sticker out of a row of printed matter and uses acrylic resin with images printed thereon as a base to form ornamental hologram stickers with colorful images thereon.

BACKGROUND OF THE INVENTION

Generally speaking, there are two ways of making hologram ornamental stickers:

(1) A plurality cutters are made to conform to the contours of different images to be printed, and a series of color images are printed in a row onto a sticker base by a label printing machine. Afterwards, different images on the row are cut out by the corresponding cutter. This method of making hologram stickers causes several problems and has several manufacturer disadvantages, which are:

(a) High cost of making separate cutters:
　Since each of the cutters is specially made to conform to the contours of each of the different images, it is impossible to use only one cutter to cut out different images. Therefore, only one cutter is suitable for one particular image, which increases the cost if the manufacturer is going to produce a lot of different hologram stickers.

(b) Poor alignment of the cutter with the image:
　Because the cutter is made to conform to the contour of the image printed onto the sticker base, the size of the cutter does not always precisely replicate the size and shape of the image. Furthermore, when the cutter is in operation, defects to the sticker product will easily occur if the cutter is not in precise alignment with the image, which can also cause damage to the cutter.

(c) Excessive blank area left outside the edge of the image causes imperfection:
　To prevent miscutting the image by the cutter, a large portion outside the contour of the image is left blank or the size of the cutter is enlarged, which does not present the most beautiful appearance of the image.

(2) A method disclosed in U.S. Pat. No. 5,169,681 and U.S. Pat. No. 5,021,275 uses polyvinyl chloride (PVC) resin powder to mix with a plastic binder, preferably Dioctyl Phthalate (DOP). Afterwards, a sticker is formed using the process of screen printing and cooling on the mixture mentioned above. Though a cutter is not necessary, this kind of method still suffers from a series of problems, such as:

(a) Paper-like base should have temperature resistance up to 200° C., so as to form an adhesive layer for screen printing, which increases the cost of the base having this characteristic.

(b) The adhesive of the adhesive layer should have a temperature resistance from 150° C. to 180° C. without damage. However, when the temperature is up to 100° C., the adhesive of the adhesive layer currently used is damaged. To overcome this deficiency, the manufacturer has to use DOP with a high proportion of rubber therein, which increases the cost.

(c) When mixing the PVC resin powder with the DOP, poisonous HCL(G) gas is generated which is dangerous to the workers.

(d) The color printing layer composed of the mixture of the PVC, DOP and colors should also have a temperature resistance up to 150° C. to 180° C., because when the screen printing is processing the color printing layer, the layer needs to be heated up to 150° C. to 180° C. During the process of heating the layer, poisonous HCL(G) is still generated and colors of the cooled PVC resin layer melt and mix with other colors resulting in defects in the image.

(e) The rate of heating and cooling to the color printing layer in process is slow and is not cost-effective.

From the previous description, it is noted that conventional methods of producing ornamental hologram stickers do not meet the users' needs. Thus, the inventive method for producing ornamental hologram stickers presented tends to mitigate and/or obviate the aforementioned problems.

SUMMARY OF THE INVENTION

The main object of the present invention is to provide a method for making ornamental hologram stickers. The method is free of separate cutters to cut the image out, and directly prints out ornamental hologram stickers with designed figures or images.

Other objects, advantages and novel features of the invention will become more apparent from the following detailed description when taken in conjunction with the accompanying drawings.

BRIEF DESCRIPTION OF THE DRAWINGS

FIG. 1 is a schematic depicting the production of ornamental hologram stickers;

FIG. 2 is a schematic view showing the structure of the ornamental hologram stickers;

FIG. 3 is a sectional view showing the structure of the ornamental hologram stickers of the invention;

FIG. 5 is a sectional view showing the structure of the ornamental hologram stickers shown in FIG. 4.

DETAILED DESCRIPTION OF PREFERRED EMBODIMENT

Figure 4:
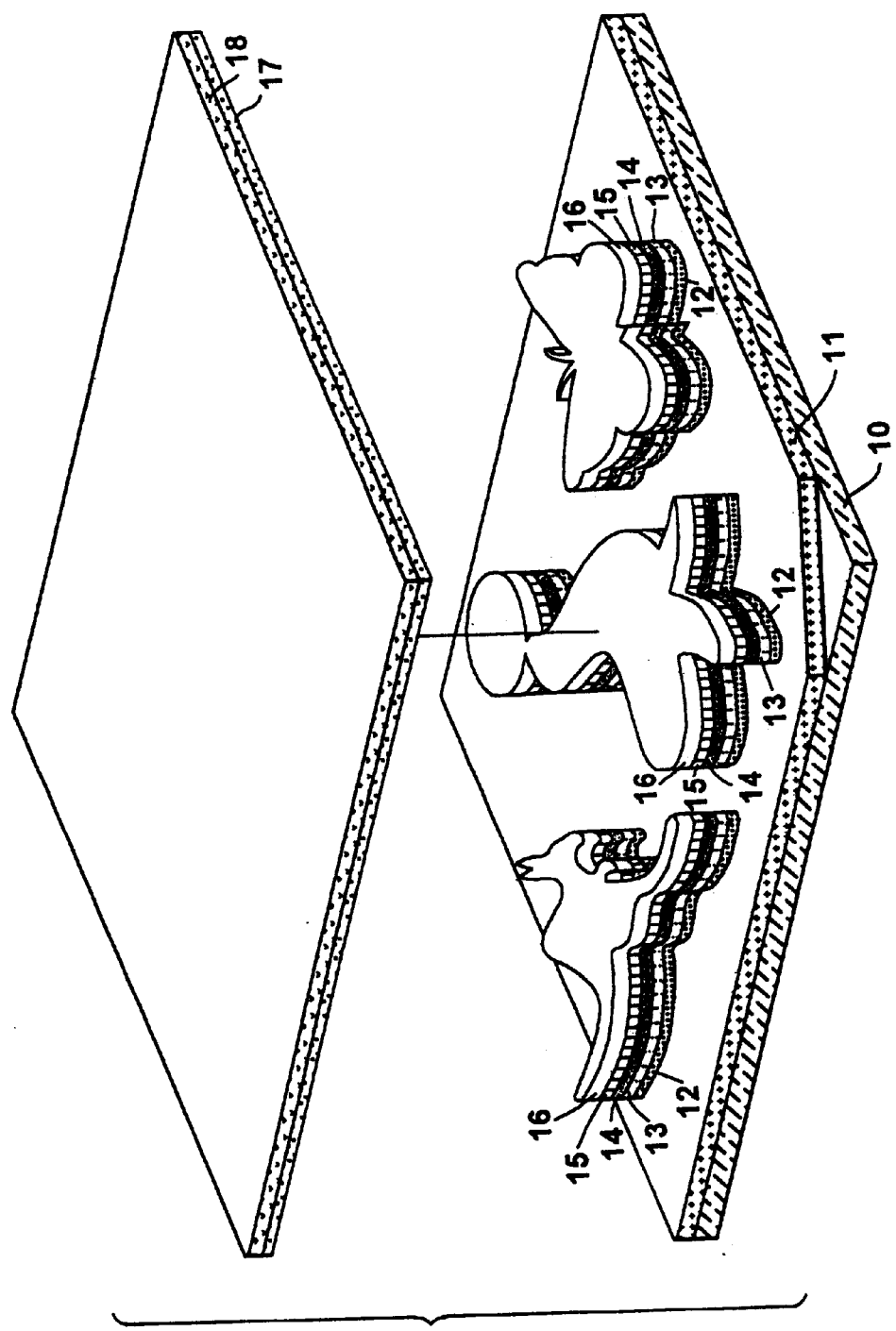
FIG. 4 is a schematic view showing the structure of the ornamental hologram stickers using a transparent film with a weak adhesive layer attached thereon to cover the stickers.

Referring to FIG. 1, FIG. 2 and FIG. 3, the method of producing ornamental hologram stickers includes the following steps:

A releasing agent is spread by screen printing onto a paper or paper-like base (10) to form a releasing layer (11) using wax, silicone, polytetrafluoroethylene or any other suitable medium as the releasing agent. The adhesive is printed on the base (10) in the different designed figures or images to form the adhesive layer (12). An acrylic resin in the same size and shape of the figures or images is screen printed on the adhesive layer (12) to form a base plate layer (13). The prints of a hologram hot-stamping foil, preferably made from golden hot-stamping foil, or silver hot-stamping foil, are printed onto the base plate layer (13) by hot-stamping at a temperature of 120° C. to 130° C. to form a hologram base layer (14). Due to the acrylic resin, the hologram hot-stamping foil will not react with the releasing layer (11), hot-stamping of the hologram hot-stamping foil can only be printed onto the base plate layer (13). The hologram base layer (14) is then added with true colors including blue, red, yellow and black by offset printing to form a color printing layer (15). Finally, a transparent resin, preferably epoxy resin and epoxy curing agent at a mixture ratio of about 3:1 or UV epoxy resin is printed onto each of the figures or images by screen printing as a protective layer (16). When the protective layer (16) cools down from the process of hot-stamping, the ornamental hologram stickers are completed.

Furthermore, after the production of ornamental hologram stickers is completed, all the figures or images of the stickers are still attached to the releasing layer (11). Users of the stickers are able to use a transparent film (18) having a weak adhesive layer (17) spread thereon to cover the stickers. Because the adhesive force between the stickers and the silicone layer (11) is weaker than the adhesion force between the weak adhesive layer (17) and the stickers, the stickers are able to be peeled off from the silicone layer (11) by pulling the transparent film (18).

Referring to FIGS. 4 and 5, it is noted that the structure of the stickers is the same as the ones shown in FIGS. 1 and 2. However, the transparent film (18) having a weak adhesive layer (17) attached thereon is used to cover the stickers, such that the stickers are able to be separated from the silicone layer (11).

It is to be understood that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for making ornamental hologram stickers comprising the following steps:

coating a releasing agent onto a paper base to form a releasing layer;

adding adhesive resin to the releasing layer in a particular form by screen printing to form an adhesive layer;

adding a base plate layer with the same form as the adhesive resin to the adhesive layer;

adding patterns to the base plate layer to form a hologram base layer via hot-stamping;

adding a form to the hologram base layer to form a color printing layer;

adding a transparent foil on the color printing layer by screen printing to form a protective layer; and adding a weak adhesive film on the protective layer, thereby allowing the sticker to be separated from the releasing layer.

2. The method as claimed in claim 1, wherein the form added to the hologram base layer is by screen printing.

3. The method as claimed in claim 1, wherein a hologram hot-stamping foil is added on the base plate layer.

4. The method as claimed in claim 3, wherein the hologram hot-stamping foil is gold hot-stamping foil.

5. The method as claimed in claim 3, wherein the hologram hot-stamping foil is silver hot-stamping foil.

6. The method as claimed in claim 1, wherein the form added to the hologram base layer is by off-set printing.

7. The method as claimed in claim 1, wherein the releasing agent comprises: wax, silicone, or polytetrafluoroethylene.

8. The method as claimed in claim 1, wherein the base plate layer is made of acrylic resin.

9. The method as claimed in claim 1, wherein the protective layer is made of the mixture of epoxy resin and epoxy curing agent.

10. The method as claimed in claim 1, wherein the protective layer is made of UV epoxy resin.

* * * * *